US007840573B2

(12) United States Patent
Adams et al.

(10) Patent No.: US 7,840,573 B2
(45) Date of Patent: Nov. 23, 2010

(54) TRUSTED FILE RELABELER

(75) Inventors: David E. Adams, Ashburn, VA (US);
Bryan C. Ericson, Urbana, IL (US);
Chad J. Hanson, Champaign, IL (US);
George P. Kamis, Sterling, VA (US);
James E. Maple, Purcellville, VA (US);
Victor A. Serbe, Decatur, IL (US);
Venkatesh S. Yekkirala, Urbana, IL (US)

(73) Assignee: Trusted Computer Solutions, Herndon, VA (US)

( * ) Notice: Subject to any disclaimer, the term of this patent is extended or adjusted under 35 U.S.C. 154(b) by 415 days.

(21) Appl. No.: 11/063,917

(22) Filed: Feb. 22, 2005

(65) Prior Publication Data

US 2006/0190988 A1 Aug. 24, 2006

(51) Int. Cl.
*G06F 17/30* (2006.01)
(52) U.S. Cl. ........................ 707/752; 707/753; 707/754
(58) Field of Classification Search ...................... 707/3, 707/9, 10, 752, 753, 754; 709/243; 715/703, 715/531, 758; 704/275
See application file for complete search history.

(56) References Cited

U.S. PATENT DOCUMENTS

| 5,941,947 | A | * | 8/1999 | Brown et al. ................. 709/225 |
| 6,038,527 | A | * | 3/2000 | Renz ............................. 704/9 |
| 6,442,566 | B1 | * | 8/2002 | Atman et al. ............ 707/103 R |
| 6,560,632 | B1 | * | 5/2003 | Chess et al. .................. 709/201 |
| 6,769,016 | B2 | * | 7/2004 | Rothwell et al. ............. 709/206 |
| 6,842,773 | B1 | * | 1/2005 | Ralston et al. ............... 709/206 |
| 7,051,277 | B2 | * | 5/2006 | Kephart et al. .............. 715/229 |
| 7,552,328 | B2 | * | 6/2009 | Wray .......................... 713/166 |
| 2003/0223319 | A1 | * | 12/2003 | Kim ......................... 369/30.07 |
| 2005/0033990 | A1 | * | 2/2005 | Harvey et al. ................ 713/201 |

* cited by examiner

*Primary Examiner*—Baoquoc N To
(74) *Attorney, Agent, or Firm*—Woodcock Washburn LLP

(57) ABSTRACT

A trusted relabeler system and software is provided that allows for the simultaneous reclassification of multiple files to multiple classification labels (security domains or computer networks) through automation of the multi-person review process. Roles, used to break down the requirements of the multi-person review process, dictate what specific function a user can perform. There are three roles used: Submitter, Processor, and Reviewer. Users are assigned one or more roles and a set of source and destination classification labels inside the security policy of a specific user that are bounded (restricted) by the clearance (maximum classification) assigned to a user on the trusted operating system on which the trusted relabeler system is implemented. The bundled documents to be reclassified are virus scanned, file typed, and searched for "dirty words" indicative of a particular classification level. Files are upgraded or downgraded only if all processes are completed successfully.

22 Claims, 18 Drawing Sheets

Relabeler Application Functional Flow Diagram

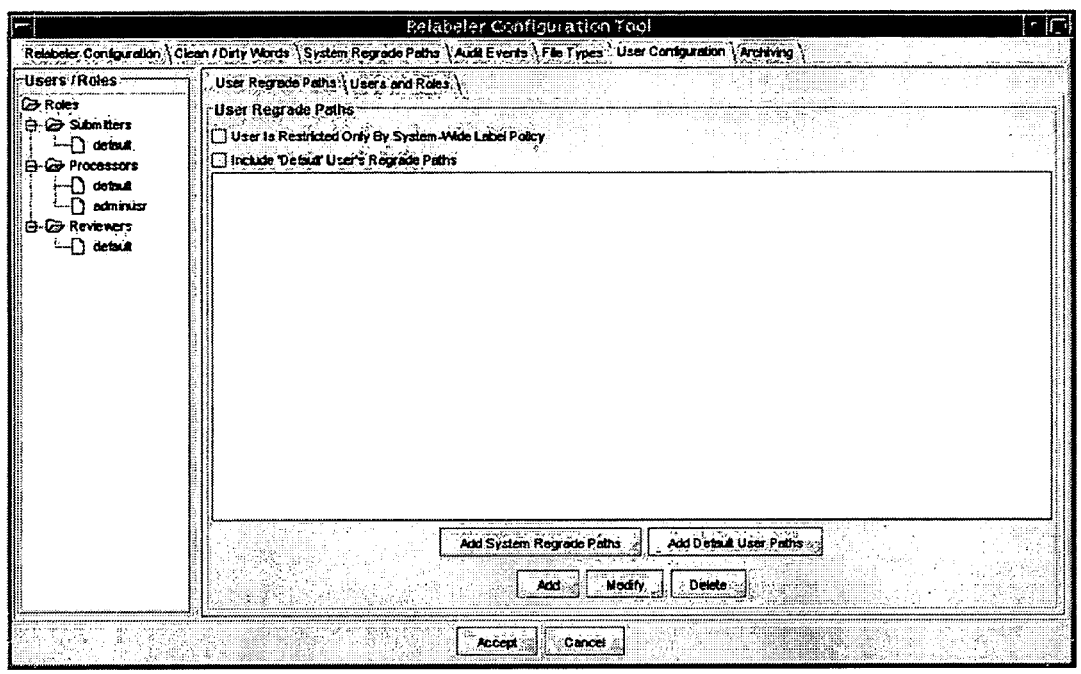
Figure 1. Relabeler Configuration Tool – User Configuration

Figure 2. Relabeler Configuration Tool – System Regrade Paths

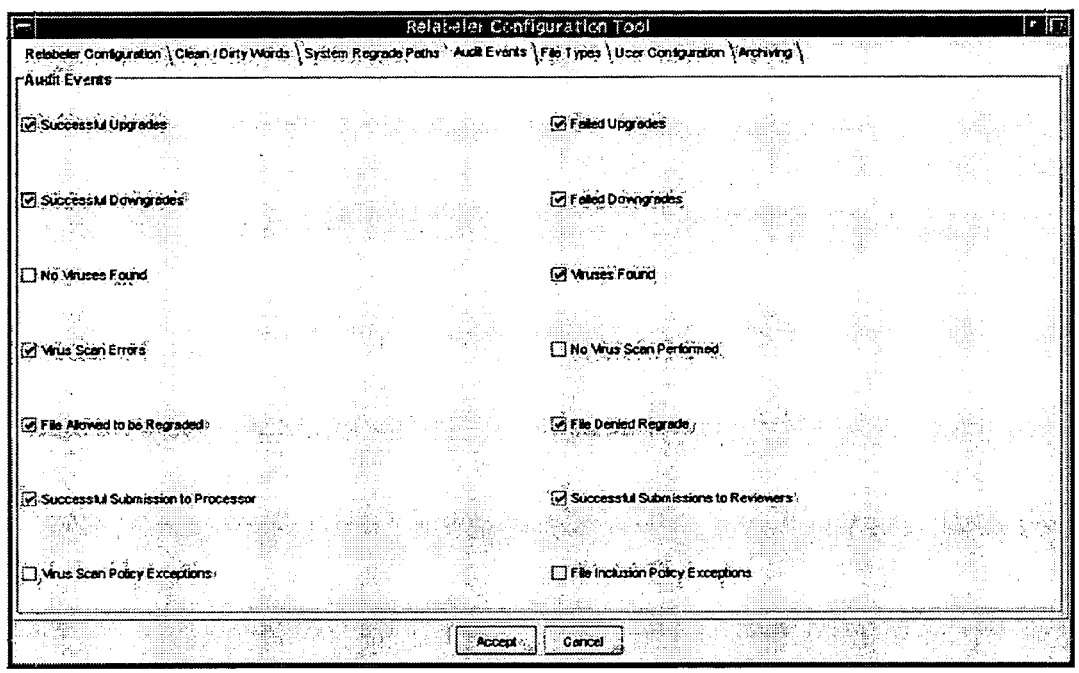
Figure 3. Relabeler Configuration Tool – Audit Events

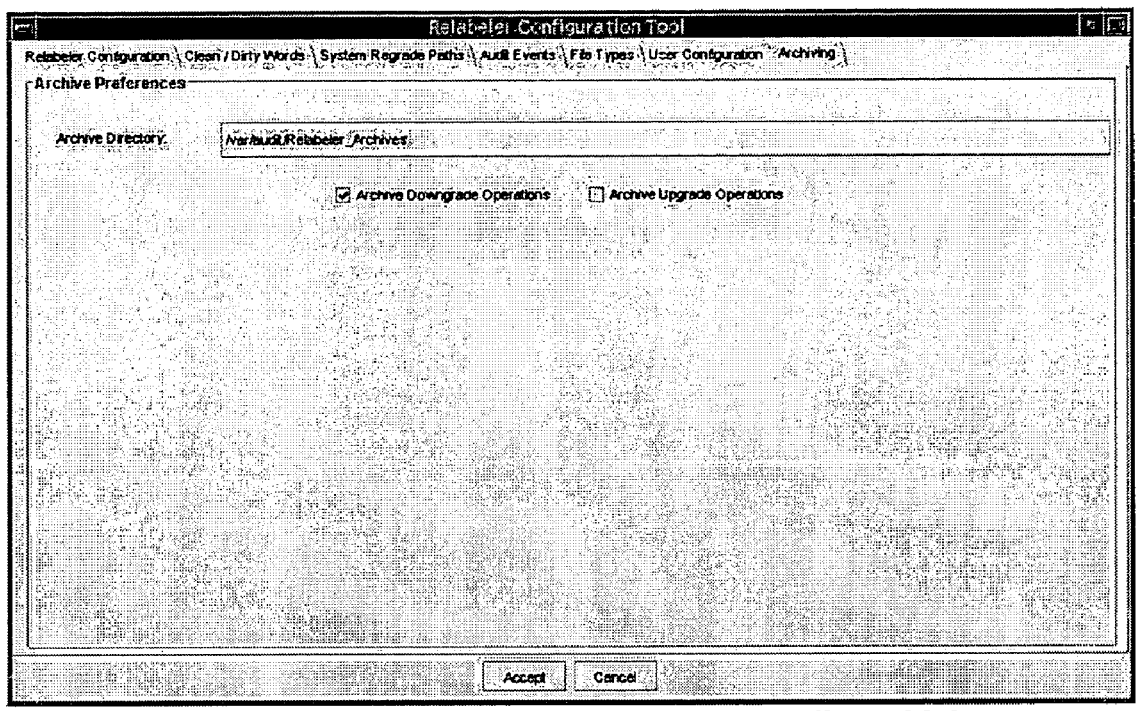
Figure 4. Relabeler Configuration Tool – Audit Archiving

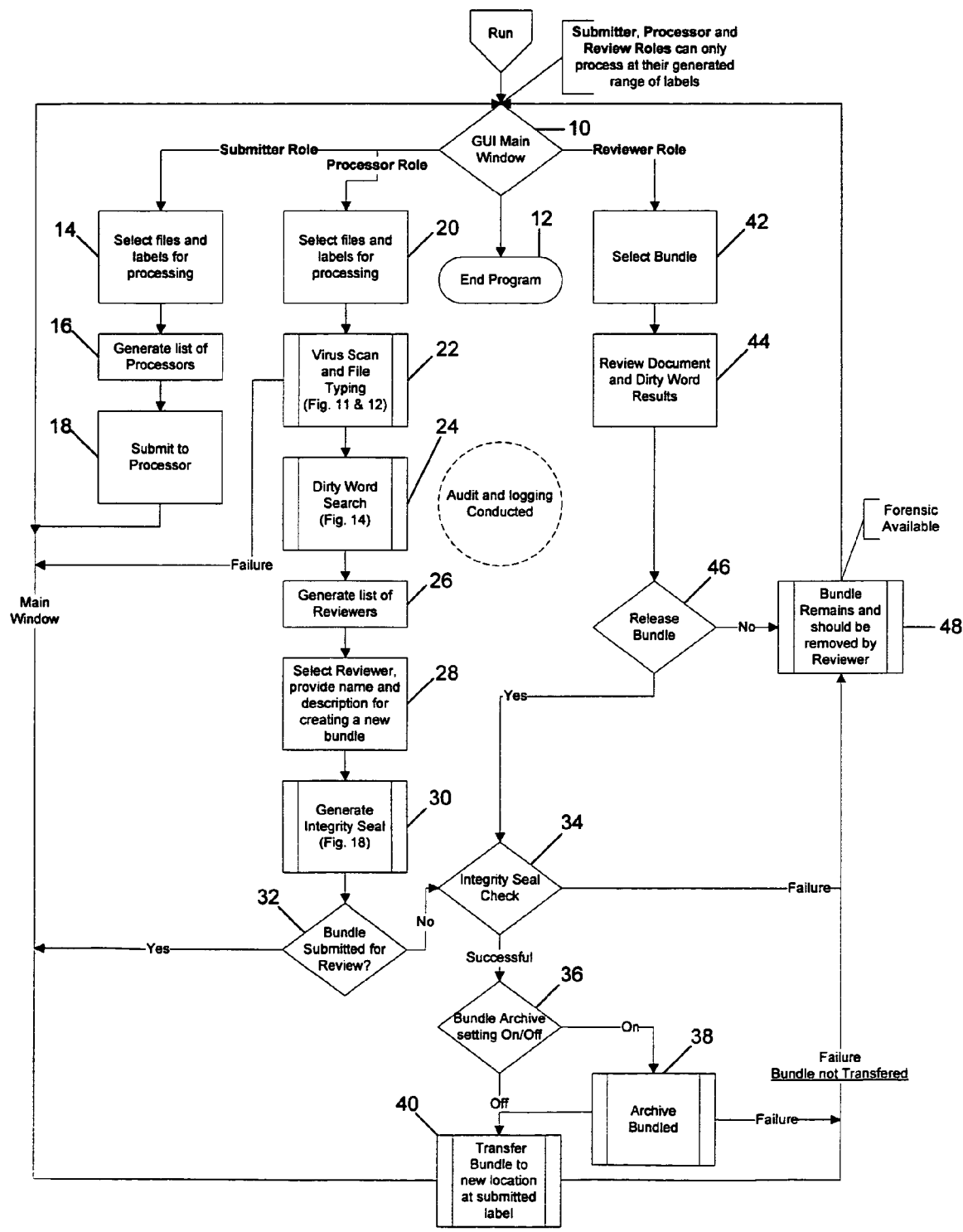
Figure 5. Relabeler Application Functional Flow Diagram

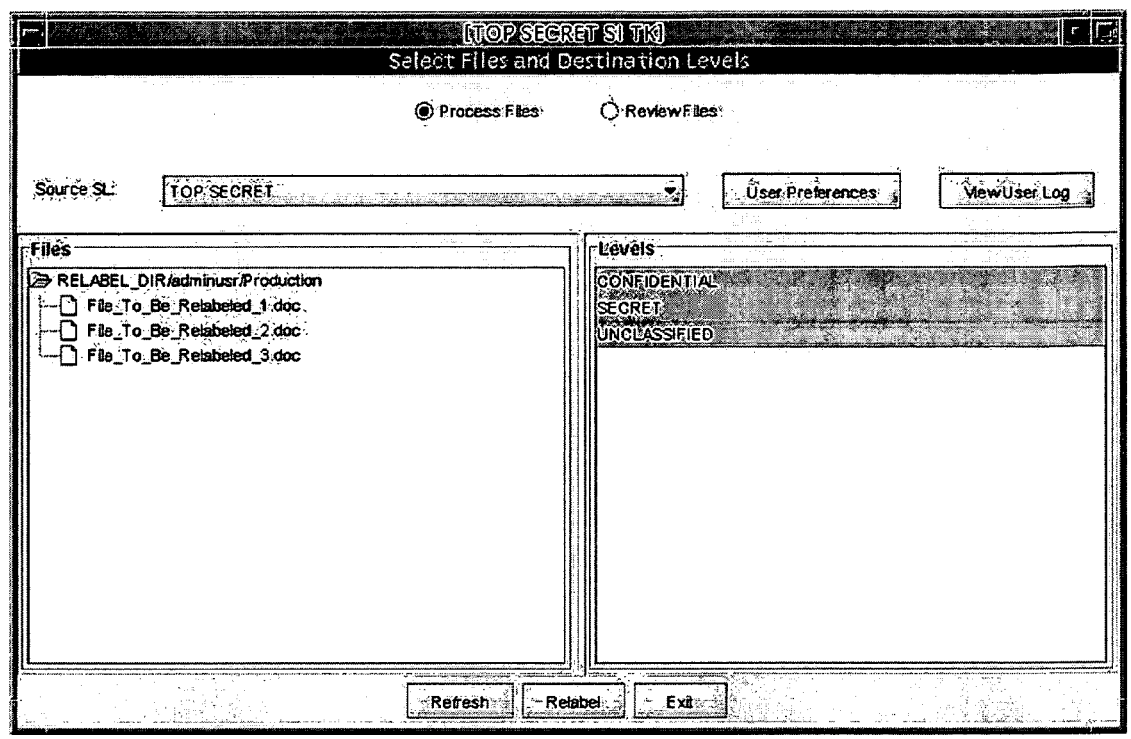
Figure 6. Relabeler – File and Destination Selection Dialog

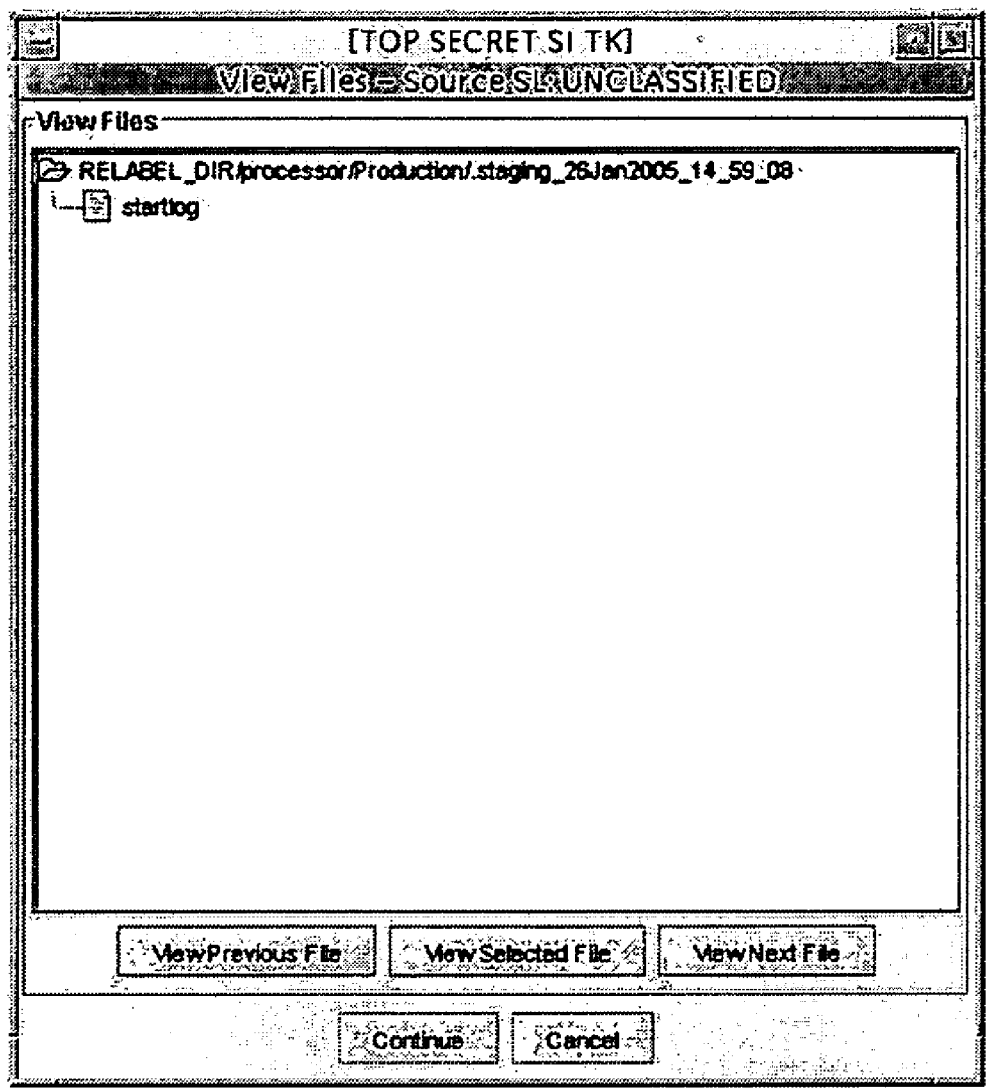
Figure 7. Relabeler – Manual Review Option Dialog

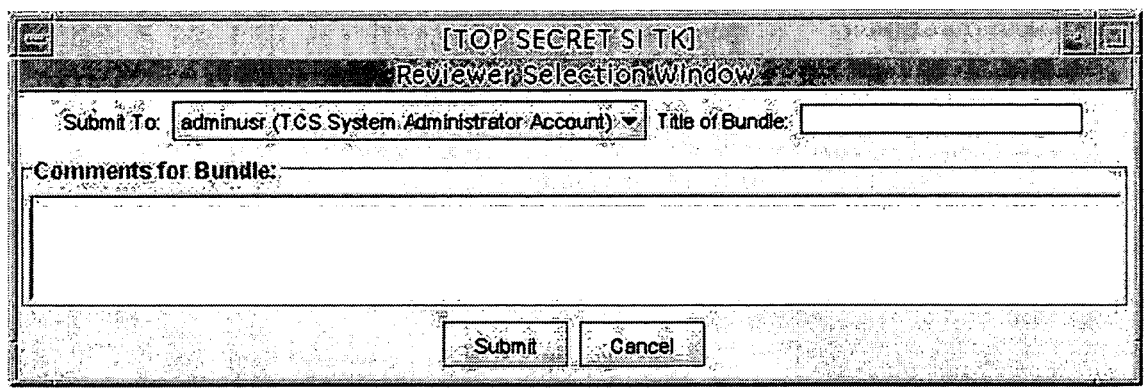
Figure 8. Relabeler Reviewer Selection Dialog

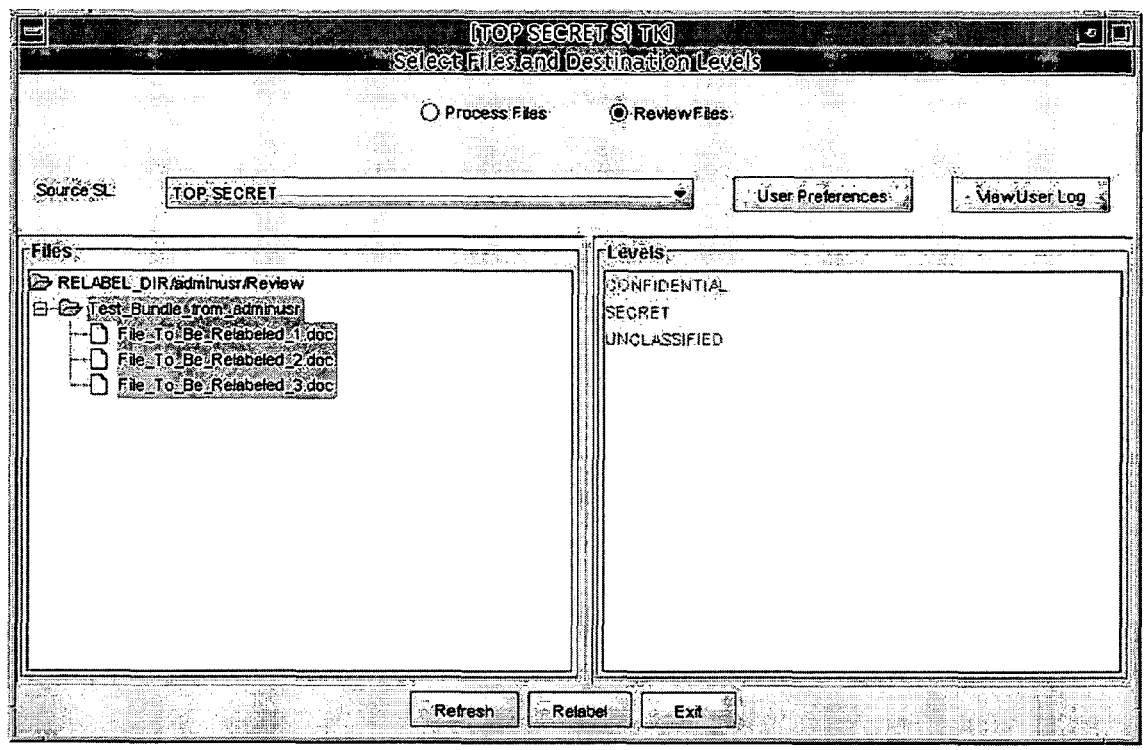
Figure 9. Relabeler Source Classification Selection Dialog

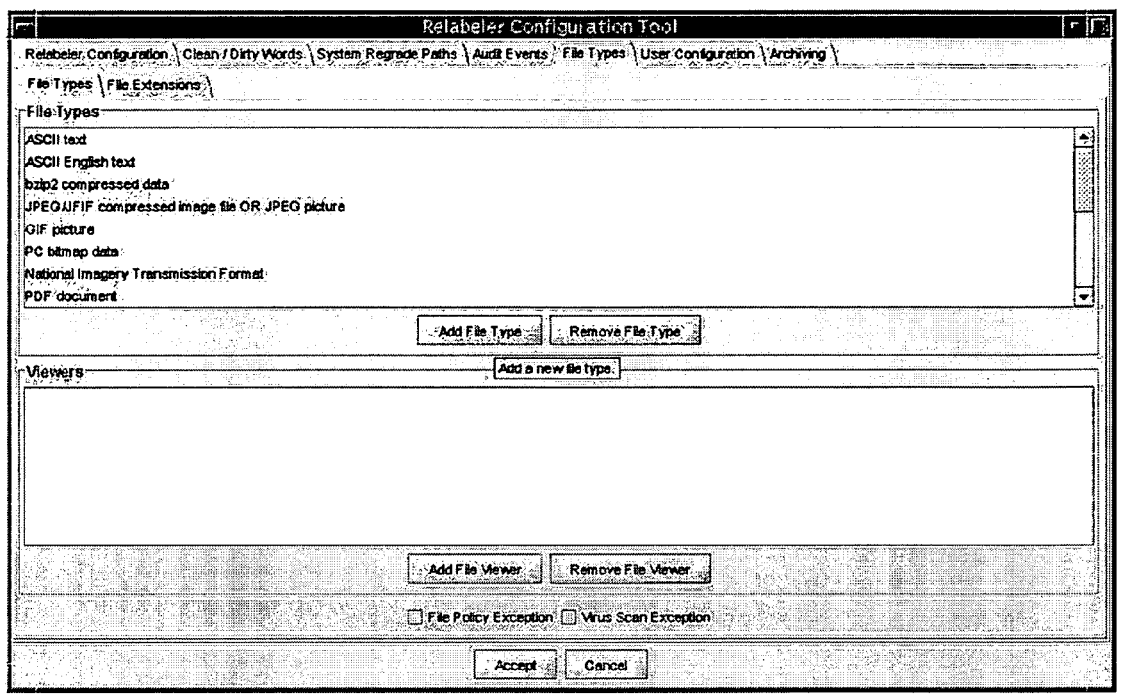
Figure 10. Relabeler Configuration Tool – File Types

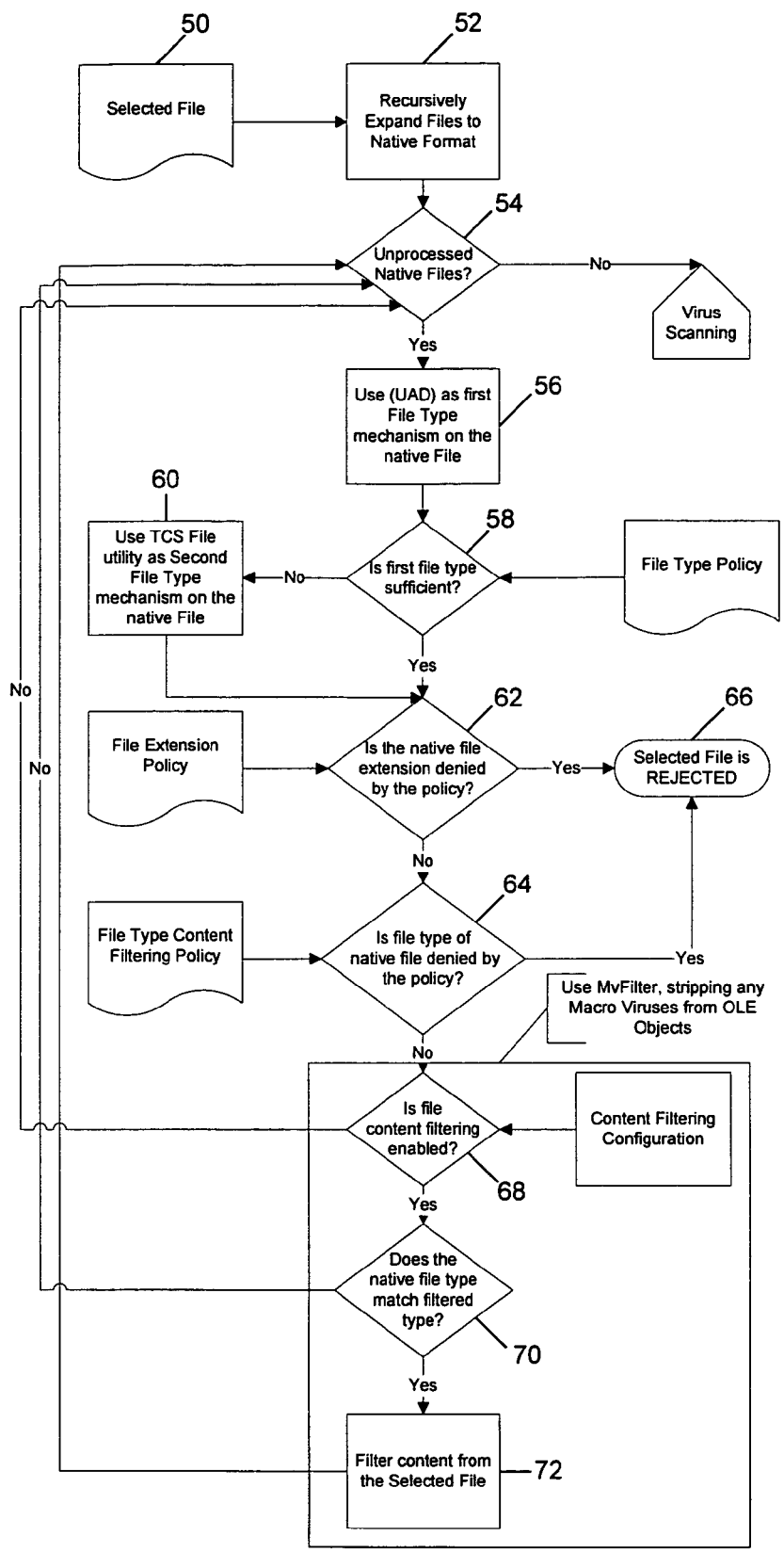
Figure 11. Relabeler File Typing High-Level Process Flow

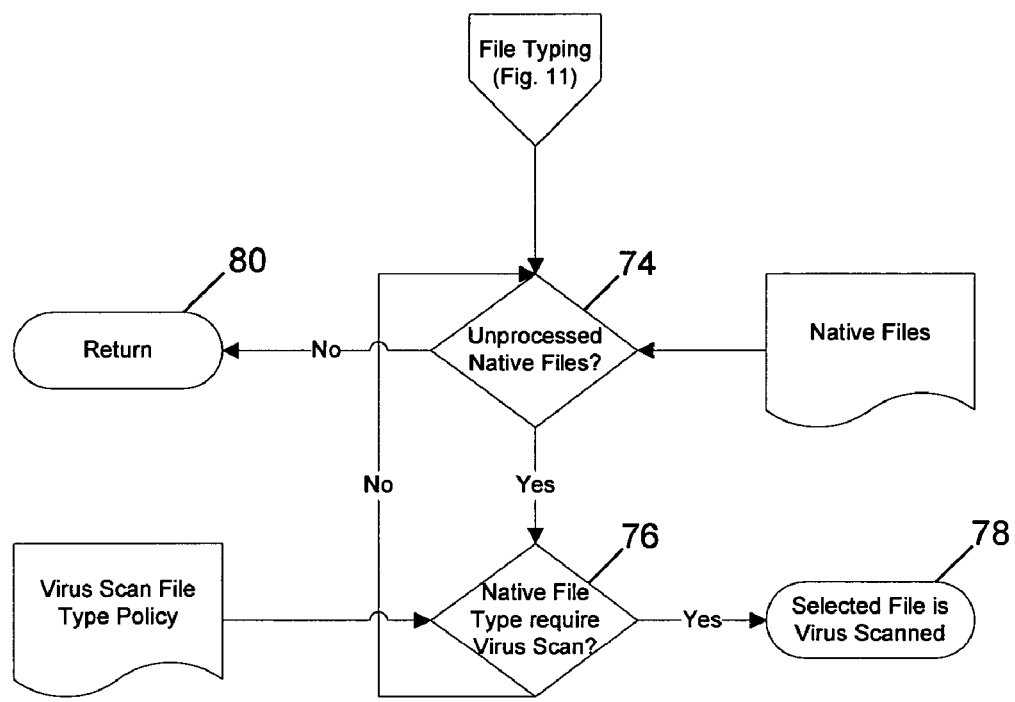
Figure 12. Relabeler Virus Scanning High-Level Process Flow

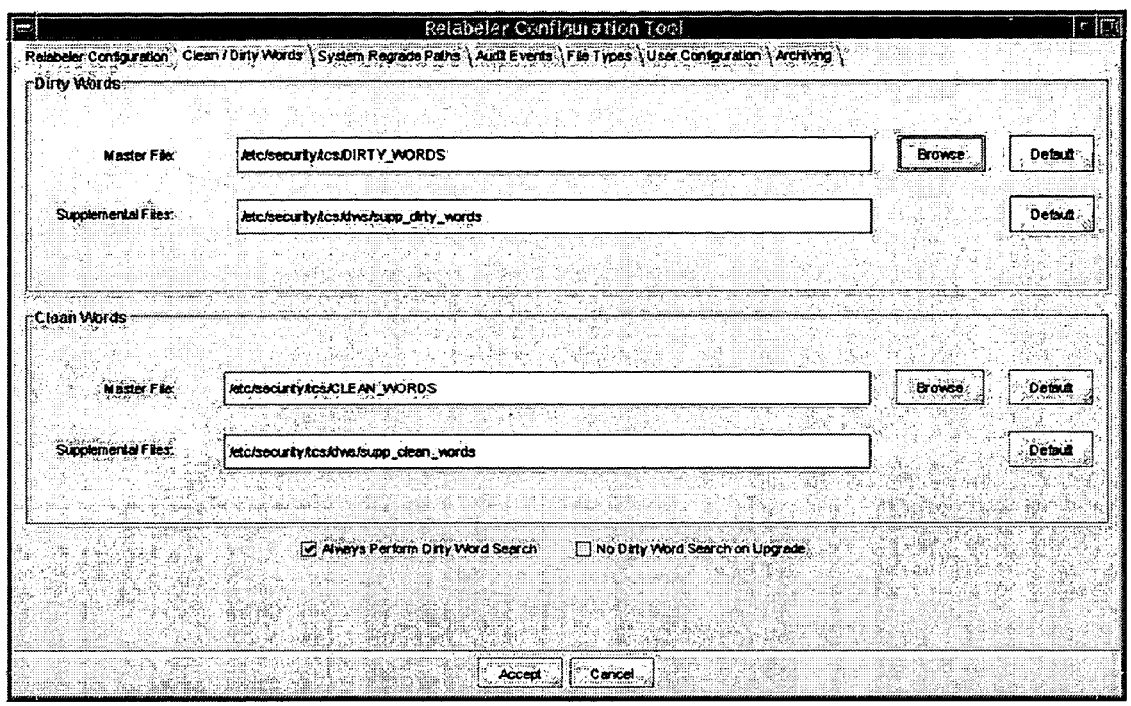
Figure 13. Relabeler Configuration Tool – Clean/Dirty Words

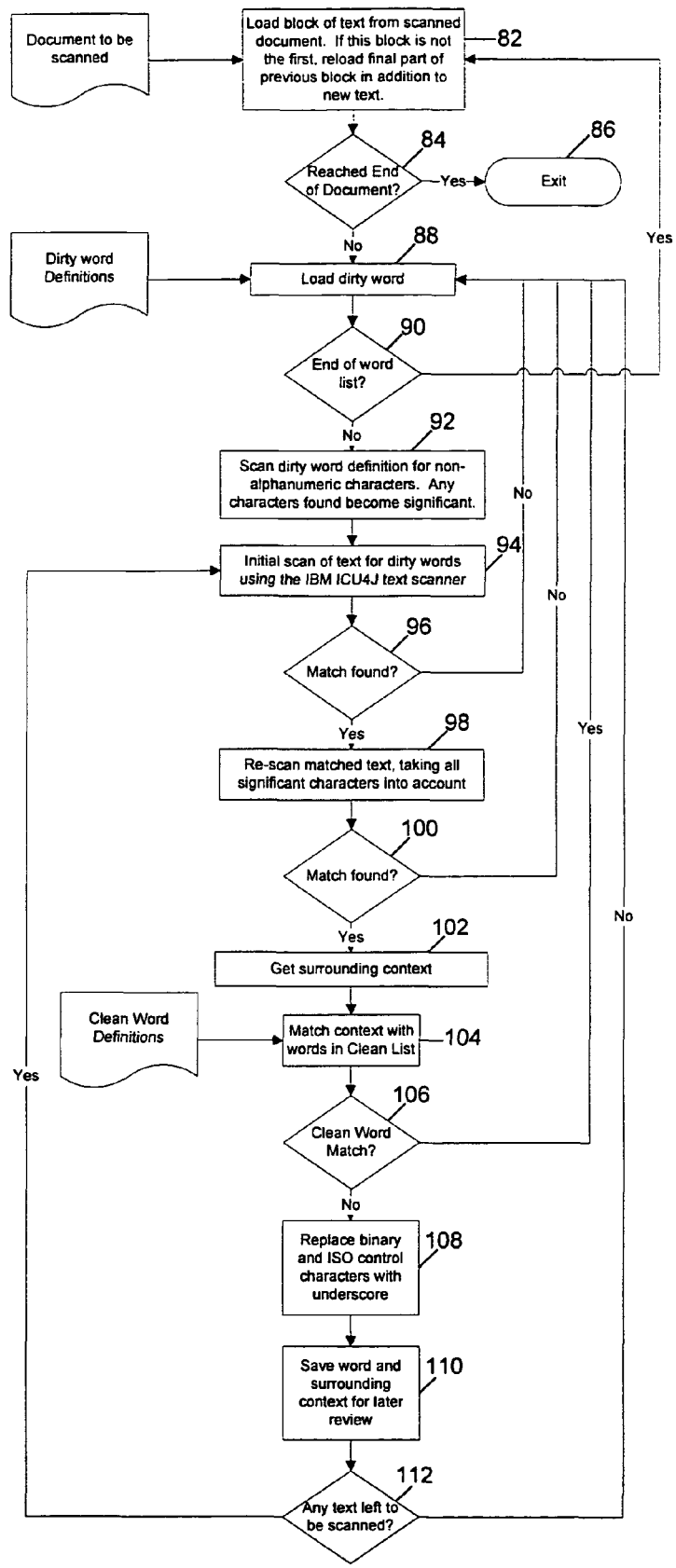
Figure 14. Relabeler Dirty Word Search High Level Process Flow

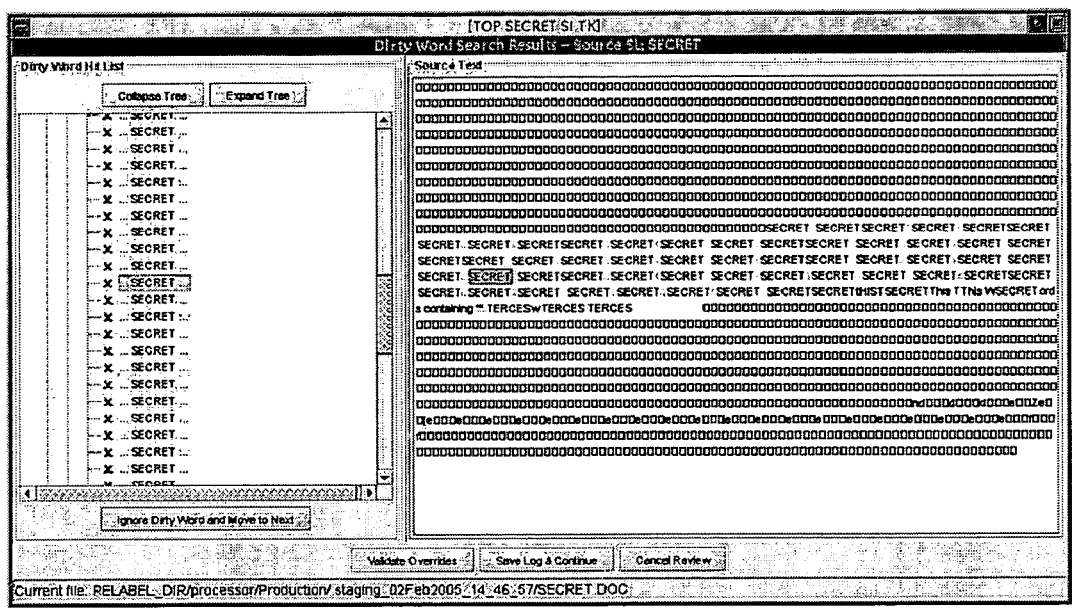
Figure 15. Dirty Word Scan of a Microsoft Document Locates a Restricted Word

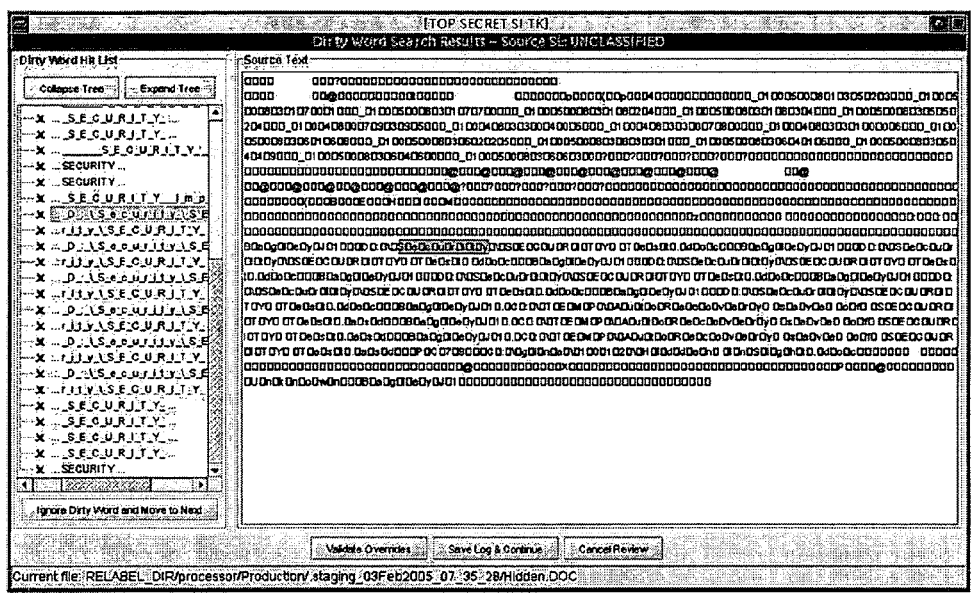
Figure 16. Dirty Word Scan Locates a Potential Restricted Word, which is Actually Part of Another Word

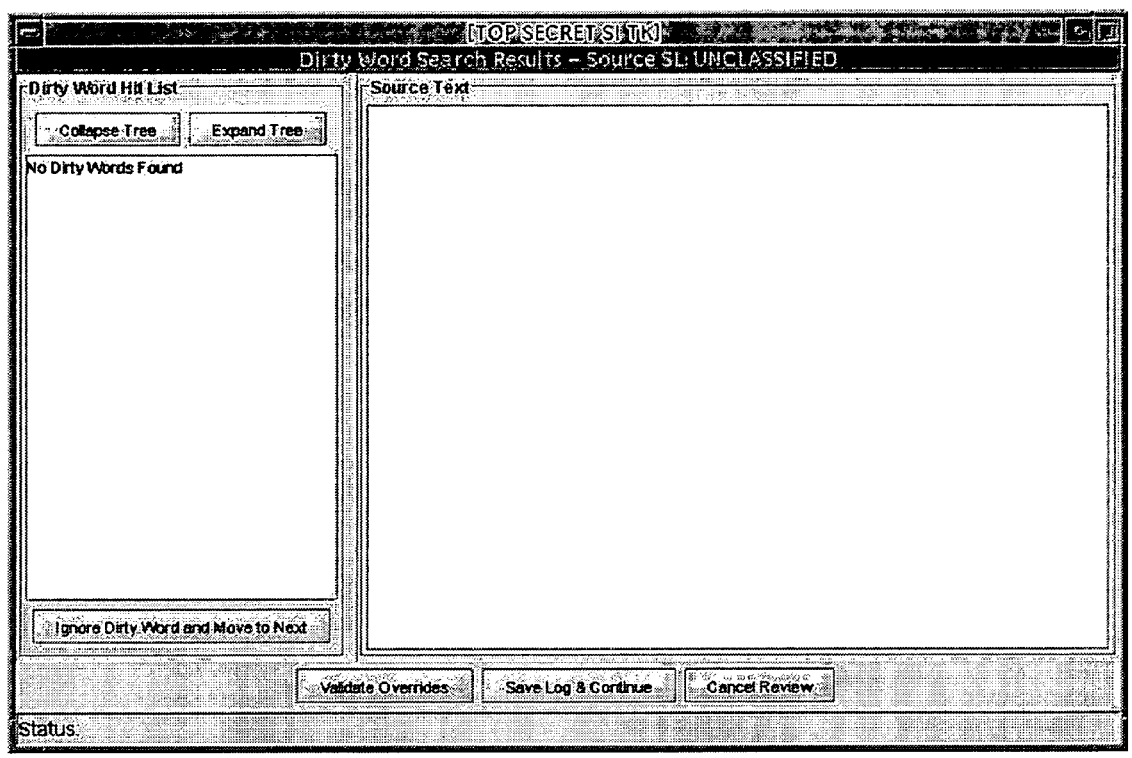
Figure 17. Dirty Word Scan Reveals Negative Result

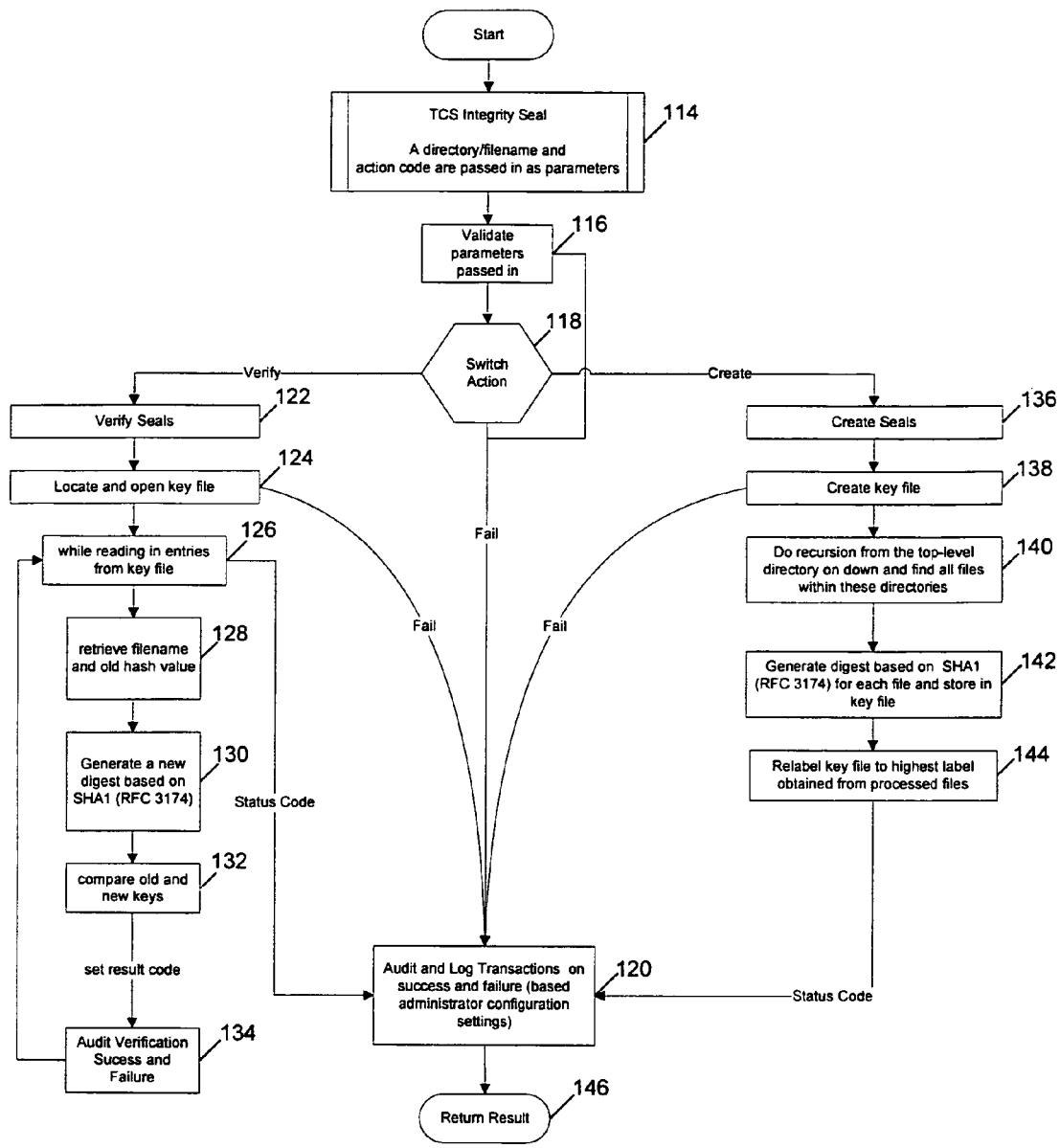
Figure 18. Integrity Seal Functional Flow

TRUSTED FILE RELABELER

FIELD OF THE INVENTION

The invention relates to computer systems and software for handling documents and communications with different levels of classified information and, more particularly, to a trusted computer system and software for securely relabeling documents and communications from one classification level to another.

BACKGROUND OF THE INVENTION

In the Department of Defense (DoD) community, security policies govern the protection and handling of classified information. These policies can be found in such documented procedures as the DoD Information Technology Security Certification & Accreditation Process (DITSCAP) and the Director of Central Intelligence Directive (DCID) 6/3. Specifically, policies exist that govern the methods by which sensitive electronic data can be transferred between computer systems at dissimilar classification levels (also known as reclassification). Trusted operating systems that use an enhanced data access control system (like Trusted Solaris or Trusted Linux) electronically "tag" data with a classification label, sometimes referred to as a classification level. (The terms "level" and "label" will be used interchangeably herein.) This label is used to control access to data and files, limiting access to only those users specifically authorized. The process of raising the classification level of a document is known as upgrading, while the process of lowering the classification level of a document is known as downgrading. When downgrading the classification level of a document, the Defense Intelligence Agency (DIA) mandates a reliable, multi-person review process requiring two people to review data prior to downgrade. However, the DIA's method is normally a time-consuming manual process in which the electronic computer data was transferred by the first reviewer to the second reviewer. Such a multi-person manual review process has proven to be problematic in that it has been difficult to enforce or provide a record that a two-person review has occurred.

Prior art manual relabeling processes are further limited in that a user could only relabel one file to one label or level at a time. Prior art Dirty Word Search mechanisms are not very efficient and do not find as many embedded dirty words as they should while minimizing the reports of false dirty words positives. Moreover, mechanisms for identifying file types have generally been limited to one check and do not contain a high level of confidence that it would identify the file type correctly. The visual displays of the prior art relabeling processes also have not presented information or choices clearly and efficiently for the user. An improved, automated process is desired.

A technique for automating the enforcement and auditing of multi-person review process is desired that addresses the limitations of the prior art while providing a reliable mechanism for the reclassification of electronic computer data. Preferably, such a technique will work in conjunction with a trusted operating system to provide a convenient, configurable, and secure process for document/data reclassification and transfer, while satisfying the strict government policies and procedures. The present invention addresses these needs in the art.

SUMMARY OF THE INVENTION

The trusted relabeler system and software of the invention addresses the above limitations in the prior art by allowing a user to select one or many files and submit them for relabeling at one or many dissimilar classification levels. The source and destination classification labels are based on the security policies set forth in the configuration files. These policies can apply to all users or be assigned to users on an individual basis. The simultaneous relabeling of multiple files to multiple classification labels reduces the amount of time needed to transmit documents to various computer networks.

The trusted relabeler system and software of the invention meets the government's security requirements for multi-person review by segregating the procedures of transmitting data into separate and distinct privileged roles (user features). The entire process is divided into 3 separate and distinct user features called roles (Submitter, Processor and Reviewer). Each role is assigned to a separate user to enforce a government-mandated, multiple-review process of electronic computer data prior to transmitting the data to another computer network or domain at a different classification level. This process further enforces government-mandated security requirements by preventing one single user from having the ability to complete the entire data transmission process by forcing a two-person or three-person integrity (TPI) concept. However, a single person release can be configured with the combined roles of Processor and Reviewer if no mandatory multiple person review policy is in place.

The trusted relabeler system and software of the invention further combines the use of commercially available mechanisms and proprietary methods to conduct three separate and distinct examinations of electronic data to identify and validate the true type of content or information (known as the file type). Files are decomposed into their lowest-level, elementary (native) form using, for example, a decomposition software tool, and each native file is then analyzed to determine its true file type using one or more signature-based tools (e.g., UAD and MAGIC database) that determine the type of content contained within the file. The last examination is performed using the file extension contained in the name of the file. If both the file type and file extension are allowed based on security policies set forth in the configuration files, the file is allowed for processing. Otherwise, processing of the file and its associated bundle is rejected. Virus scanning software may also be integrated as a further review of the file contents.

The trusted relabeler system and software of the invention further submits each document through a data content examination known as a Dirty Word Search (DWS). The DWS is an added level of security to ensure that the content of a file does not contain words that would result in that file being set to an inappropriate classification label. The concept of dirty (must be validated) words and clean (allowed) words are used in the configuration of the trusted relabeler system. The DWS function iterates over blocks of data that compose the file content and analyzes each block to determine which words are not allowed for the selected classification label. The DWS function uses the IBM ICU4J string search library to scan a block of data for the presence of a particular word. The Trusted Relabeler then performs additional validation of any matches by validating the existence of any non-alphanumeric characters in the match. All words that are deemed as inappropriate for the classification label are then presented to the user for review. The dirty word scan will identify words within several areas of a document or file, including words that are part of the textual content (body) of a document and words that are embedded as part of another word (e.g. SECRET is in SECRETARY). It will also find words in areas of a file that may be hidden or not otherwise be visible to the user (e.g. Metadata). If a scan of a file reveals no results, the user is presented with the statement "No Dirty Words Found" and allowed to proceed with the relabeling. On the other hand, when Dirty Word Search (DWS) results are found, the user is presented with a display of the word and its surrounding text from the file content. The separation of embedded and non-embedded words, in addition to the visual display of the word within the file content, results in a simplified and secure user process for reviewing word matches and determining which can be allowed (approved) and which are truly inappropriate words for a specific classification label.

The trusted relabeler system and software of the invention further implements an integrity seal process to prevent tampering. For example, when the Submitter selects electronic computer data for transmission locally or to another computer network or domain, the secure hash algorithm SHA-1 is used to ensure the integrity of the electronic computer data as it is passed to the next role for processing. The integrity seal function uses SHA-1 to generate a 160-bit condensed representation of a message, called a message digest, suitable for use as a digital signature. The message digest is used to ensure that documents contained in a bundle to be processed are not modified between the Processor and Reviewer stages of the multi-person reclassification process. Furthermore, additional security measures are employed to ensure the SHA-1 message digest for the bundle cannot be computed by other SHA-1 utilities external to the trusted relabeler system and software.

A system and method for implementing these individual features will be described in detail below.

BRIEF DESCRIPTION OF THE DRAWINGS

The foregoing summary, as well as the following detailed description of the invention, is better understood when read in conjunction with the appended drawings. For the purpose of illustrating the invention, the drawings include exemplary embodiments of various aspects of the invention; however, those skilled in the art will appreciate that the invention is not limited to the specific methods and instrumentalities disclosed. In the drawings:

FIG. 1 illustrates a GUI to the trusted relabeler software of the invention illustrating each role assigned to a user.

FIG. 2 illustrates a GUI to the trusted relabeler software of the invention illustrating a list of Regrade Paths that provides sets of source and destination classification labels under which the user with a particular role can perform operations.

FIG. 3 illustrates a GUI to the trusted relabeler software of the invention illustrating auditing options for the specific events that should be recorded during use of the trusted relabeler software.

FIG. 4 illustrates a GUI to the trusted relabeler software of the invention illustrating archiving options upon the completion of reclassification upgrades, downgrades, or neither.

FIG. 5 illustrates a high level flow chart of the process implemented by the trusted relabeler system of the invention.

FIG. 6 illustrates a GUI to the trusted relabeler software of the invention illustrating the file and destination selection dialog with the user.

FIG. 7 illustrates a GUI to the trusted relabeler software of the invention illustrating a manual review option dialog with the user.

FIG. 8 illustrates a GUI to the trusted relabeler software of the invention illustrating a reviewer selection window.

FIG. 9 illustrates a GUI to the trusted relabeler software of the invention illustrating a window for selecting the source classification bundle for processing.

FIG. 10 illustrates a GUI to the trusted relabeler software of the invention illustrating a file type configuration window.

FIG. 11 illustrates a high level flow chart of the file typing process implemented by the trusted relabeler system of the invention.

FIG. 12 illustrates a high level flow chart of the virus scanning process implemented by the trusted relabeler system of the invention.

FIG. 13 illustrates a GUI to the trusted relabeler software of the invention illustrating an interface for specifying the location of dirty/clean word dictionary files.

FIG. 14 illustrates a high level flow chart of the dirty word search process implemented by the trusted relabeler system of the invention.

FIG. 15 illustrates a GUI to the trusted relabeler software of the invention illustrating dirty words in the textual content of a document.

FIG. 16 illustrates a GUI to the trusted relabeler software of the invention illustrating dirty words in areas of a file that may be hidden to a user.

FIG. 17 illustrates a GUI to the trusted relabeler software of the invention illustrating a dirty word scan where no dirty words were found.

FIG. 18 illustrates a high level flow chart of the integrity seal process implemented by the trusted relabeler system of the invention.

DETAILED DESCRIPTION OF ILLUSTRATIVE EMBODIMENTS

A detailed description of illustrative embodiments of the present invention will now be described with reference to FIGS. 1-18. Although this description provides detailed examples of possible implementations of the present invention, it should be noted that these details are intended to be exemplary and in no way delimit the scope of the invention. All limitations of the invention are set forth in the appended claims.

Overview of the Invention

The invention provides a trusted relabeler system and software that allows for the simultaneous reclassification of multiple files to multiple classification labels (security domains or computer networks) through automation of the multi-person review process. Roles, used to break down the requirements of the multi-person review process, dictate what specific function a user can perform. There are three roles used by the invention: Submitter, Processor, and Reviewer. The Submitter is allowed to submit one or more documents for reclassification (this is the only function of the Submitter). The Processor is allowed to submit one or more documents for reclassification, perform an initial review and acceptance of the document, and assign a specific Reviewer for the document. The Reviewer is allowed to perform final verification and, upon acceptance, allows the document to be reclassified appropriately. Users are assigned one or more roles and a set of source and destination classification labels (known as Regrade Paths). Regrade Paths inside the security policy of a specific user are bounded (restricted) by the clearance (maximum classification) assigned to a user on the trusted operating system on which the invention is implemented. Users are assigned designated directory (folder) structures for storing groups of files (known as bundles) during the stages of the reclassification process. The bundled documents to be reclassified are virus scanned, file typed, and searched for "dirty words" indicative of a particular classification level. An integrity seal is generated to verify that the files are not tampered with between processing by the Processor and the Reviewer.

Files are upgraded or downgraded only if all processes are completed successfully. Details of this reclassification process will be provided below.

Trusted Relabeler Security Policies

Security policies are used to govern the functionality of the trusted relabeler system of the invention. These security policies are accessed through the use of configuration files (the access of which is protected by the trusted operating system) and/or a Lightweight Directory Access Protocol (LDAP) database server. The configuration file or LDAP database maintains role assignments, a Submitter's list of Processors, a Processor's list of Reviewers, and Regrade Paths (sets of allowed source and destination labels) assigned to roles or specific users. All other security policies are stored in a trusted relabeler configuration file. The following are the setup steps required for establishing the security policies used in the trusted relabeler system of the invention.

1. Create LDAP Database Schema or Authorizations

A LDAP database schema is created for maintaining the roles assigned to a user. In accordance with the invention, a user may be assigned multiple roles under certain circumstances. As illustrated in the graphical user interfaces of FIGS. 1 and 2, for each role assigned to a user, a list of Regrade Paths is maintained that provides sets of source and destination classification labels under which the user with a particular role can perform operations. If the role is a Submitter, a list of specific Processors that can be selected by the Submitter as part of the multi-person review process is maintained. If the role is a Processor, on the other hand, a list of specific Reviewers that can be selected by the Processor as part of the multi-person review process is maintained.

Alternatively, authorizations may be created on the trusted operating system for assigning roles to a user. Authorizations are an alternative means of granting a role versus use of the LDAP database described in the previous paragraph.

2. Create a Configuration File

A configuration file is created and stored at the highest classification label on the trusted operating system. As will be explained in more detail below, the configuration file contains the following configuration parameters identifying functions of the trusted relabeler of the invention:

Dirty Word Search—Options are provided to specify whether a dirty word search is performed for upgrades (raising the classification label), downgrades (lowering the classification label), or incomparable classification levels sometimes referred to as crossgrades Virus Scan—Options are provided to specify whether a virus scan is performed for upgrades (raising the classification label), downgrades (lowering the classification labels), or incomparable classification levels sometimes referred to as crossgrades.

File Typing—Options are provided to specify what file extensions and file types are allowed in the reclassification process.

Manual File Viewing—Options are provided to specify whether a visual file review is required or not required in the reclassification process.

Auditing options (FIG. 3)—Options are provided to specify what specific audit events will be recorded during the use of the trusted relabeler of the invention.

Archiving options (FIG. 4)—Options are provided to specify whether an archived copy of a bundle is saved upon the completion of reclassification for upgrades (raising the classification label), downgrades (lowering the classification label), or incomparable classification levels sometimes referred to as crossgrades.

3. Create the Relabel_Dir

For each user involved in the multi-person review process, a directory called Relabel_Dir is created containing the subdirectories Production, Review, and Released. These directories are used when moving bundles between different roles and classifications during the stages of the reclassification process. The Relabel_Dir is created as a "multi-level directory" or MLD on the trusted operating system in order to properly segregate data at multiple classification labels. A MLD allows for distinct files of the same name to exist at multiple classification labels within a single directory, which is desired to move files from one classification level to another.

The following section explains with respect to FIG. 5 the detailed implementation of the multi-level review process in the trusted relabeler system of the invention.

Initialize Application

As illustrated in FIG. 5, upon initialization, the trusted relabeler software of the invention reads the configured security policies in the main window of the graphical user interface at step 10 to determine what roles, if any, are assigned to the user. As noted above, roles are assigned to users via an LDAP database or through trusted operating system authorizations. If the user has not been assigned any role, an error message dialog for the user is generated, the standard computer system logs and security audit records are updated with the event, and then the system exits at step 12. Otherwise, the system reads the configured security policies and determines which Regrade Paths have been assigned to the user for each assigned role. As shown in FIG. 2, Regrade Paths are the source and destination classification label sets in which the user is allowed to perform role operations in the trusted relabeler software. The list of Regrade Paths is compared to the clearance (highest classification label) assigned to the user on the trusted operating system to determine the list of Regrade Paths that are permitted. The comparison of classification labels is performed using binary comparison utilities provided with the trusted operating system. If the user has not been assigned any Regrade Paths for any of the assigned roles, an error message dialog is generated for user, the standard computer system logs and security audit records are updated with the event, and then the system exits at step 12.

Displaying the Application

The primary graphical user interface (GUI) to the trusted relabeler software of the invention is displayed with selection icons or buttons that allow the following set of operations: selection of a role from a list of those available to a user, selection of a group of files at a source classification label that are available to a user, and selection of a set of destination classification labels available for the user at a specified source classification label. A sample GUI for the trusted relabeler software of the invention is shown in FIG. 6. The icon or button that allows the selection of a source classification label with the list of Regrade Paths generated in the previous step is then populated. Based on the currently selected source classification label, the appropriate destination classifications in the dialog are populated. Also, based on the currently selected source classification label, the available filenames and bundles stored in the appropriate staging directory in the dialog are also populated. Those skilled in the art will appreciate that a GUI of the type illustrated in FIG. 6 can be written in a number of different programming languages, although an exemplary embodiment of the trusted relabeler GUI is developed using a trusted C (or C++) program that utilizes Java programs and shell scripts. If any errors occur during this process, an error message dialog for the user is generated, the standard computer system logs and security audit records are updated with the event, and then the system exits at step 12.

As illustrated in FIG. 5, from the main GUI, the Submitter, Processor, and Reviewer roles each have a distinct functional flow that will now be described.

The Submitter

As shown in FIG. 5, the trusted relabeler software of the invention reads the user's selected source classification label, a group of files at the source classification label, and a set of destination classification labels from the main GUI (FIG. 6) at step 14. The Submitter is then prompted to select an authorized Processor for handling the document requests and a bundle name for the set of files is selected at step 16. The list of Processors available for the Submitter is generated at step 16 using the security policies initially read at startup. Upon selection of input from user, the bundle is then saved under a dedicated subdirectory inside the staging directory for the selected Processor at the source classification label at step 18. If any errors occur during this process, an error message dialog for user is generated, the standard computer system logs and security audit records are updated with the event, and the system exits at step 12.

The Processor

As illustrated in FIG. 5, the trusted relabeler software of the invention reads the user's selected source classification label, a group of files or bundle at the source classification label, and a set of destination classification labels at step 20. Upon selection of input from the user, the files in a bundle are then subjected (based on security policy configurations), to security functions known as File Typing and Virus Scan (FIGS. 11 and 12) at step 22 and a Dirty Word Search (FIG. 14) at step 24. The results of the Dirty Word Search are stored in a log file and made available to the Reviewer in a later stage of the reclassification process. If any of these operations result in a denial or failure, an error message dialog to the user is generated, the standard computer system logs and security audit records are updated with the event, and then the software is exited at step 12.

The user is then prompted to visually review via a manual process for each file for additional security validation. Depending on the security policy, the Processor may be required to review all files manually (FIG. 7). The Processor is further prompted to select a Reviewer at steps 26 and 28 (FIG. 5) and to assign a name and description for the bundle (FIG. 8). The bundle is then stored in the selected Reviewer's staging directory. A cryptographic integrity seal is then generated based on the contents of the bundle at step 30 (FIG. 5). The integrity seal, described in more detail below with respect to FIG. 18, is a security mechanism used to verify that the contents of the bundle have not been modified between the time Processor submitted the files and the Reviewer performed final release of the bundle. If the Processor chooses a Reviewer other than itself, the Processor function is completed. However, if the Processor chooses itself as the Reviewer, the user is prompted to determine whether the bundle is to be released immediately or whether the Bundle is to be submitted for review as the normal two-person review process Otherwise, if the Processor chooses to release the bundle immediately, processing continues by verifying the integrity seal at step 34. If the integrity seal verification at step 34 is successful, an archived copy of the bundle is created at steps 36, 38 if the option is set in the security policies (FIG. 5). If the archive operation is successful, the user is prompted with a final acceptance dialog for acknowledgement of the reclassification operation that is currently taking place. If the user acknowledges the prompt, the classification of the files in the bundle is modified and the files are moved to the original Submitter or Processor's Released directory at step 40. This is the directory where the Submitter or Processor will be able to obtain the reclassified version of the originally submitted files. If any errors occur during this process, an error message dialog is generated for the user, the standard computer system logs and security audit records are updated with the event, and the system exits at step 12. If the user acknowledges the prompt, the files are reclassified and released as described in the section below entitled "Simultaneous Reclassification of Multiple Files to Multiple Classification Labels."

The Reviewer

As illustrated at step 42 in FIG. 5, the trusted relabeler software reads the user's selected source classification label and a bundle that has been submitted for reclassification. The bundles that are available for selection are those that have been submitted by a Processor as discussed in the previous paragraph. The trusted relabeler client window for selecting the source classification and bundle is shown in FIG. 9. The Reviewer is then prompted at step 44 to review the results of the Dirty Word Search (DWS) function performed in the Processor stage. If the Reviewer rejects the bundle at step 46 based on the DWS, the original Submitter or Processor is notified that the bundle was not accepted at step 48 and the bundle remains with the Reviewer. If so configured, the Reviewer is prompted to perform a visual review of the document to verify that the correct document is attached. Otherwise, processing continues by verifying the integrity seal at step 34. If the integrity seal verification is successful, an archived copy of the bundle is created at step 38 if the option is set in the security policies at step 36. If the archive operation is successful, the user is prompted with a final acceptance dialog for acknowledgement of the reclassification operation that is currently taking place. If the user acknowledges the prompt, the file is reclassified in the bundle and the files are moved to the original Submitter or Processor's Released directory at step 40. This is the directory where the Submitter or Processor will be able to obtain the reclassified version of the originally submitted files. If any errors occur during this process, an error message dialog is generated for the user, the standard computer system logs and security audit records are updated with the event, and the software exits at step 12. If the user acknowledges the prompt, the files also may be reclassified and released as described in the next section.

Those skilled in the art will appreciate that the present invention permits individual users of the invention to assume combined roles in any proposed combination of Submitter, Processor, and Reviewer. However, for additional security, it is not desirable for the Processor and Reviewer to be the same person.

Simultaneous Reclassification of Multiple Files to Multiple Classification Levels As described above, a user is allowed to select multiple files to be reclassified to multiple classification labels using the trusted relabeler software of the invention. As the final step of the reclassification process, the trusted relabeler software simultaneously creates a copy of the input files at all selected destination classification labels in the original Submitter's or Processor's Released directory. Since the Relabel_Dir directory (parent of released directory) is a "multi-level directory", distinct files of the same name may exist at multiple classification labels. The released directory is the location where the Submitter or Processor will be able to obtain the reclassified versions of the originally submitted files. The input files stored at the original classification label inside the production and review staging directories are deleted upon the successful copy of input files to the new destination classification labels.

Redundant File-Typing

The trusted relabeler software of the invention improves the process of relabeling by insuring that files are properly identified and classified. Part of the identification procedure entails the determination of data within files to be relabeled. In particular, the trusted relabeler software allows for the explicit denial or acceptance of filenames with specific file extensions or file types. A file's extension can be defined as all characters which follow the last "." in the file name. For example, Microsoft Word documents have a ".doc" extension (letter.doc), which identifies it as a Word document. Another example is ".ppt" (briefing.ppt), which identifies a file as a Microsoft PowerPoint document. Historically, some computer systems have relied solely on this filename suffix for determining the file type. Unfortunately, many computer systems are exploited because hackers can intentionally name a virus with a common file extension to smuggle it past perimeter security defenses. A more accurate and secure means of determining a file type is achieved by actually examining the file's content. A file type can usually be determined by reading the first few bytes of a file's content. File-typing is a more accurate practice for determining what data a file contains versus relying solely on the file's visible extension. As shown in FIG. 10, the trusted relabeler software of the invention allows the configuration of policies for how both file extensions and true file types are to be treated when processing bundles.

Determining the File Type

A high level process flow of a file-typing system in accordance with the invention is illustrated in FIG. 11. As illustrated, the file typing process is performed by the Processor and occurs immediately after the selection of files for a bundle at step 50. The first step in the file typing process is the expansion of all files in the bundle to their native formats at step 52. This is due to the fact that documents submitted could be compressed (e.g. ZIP) or of other archive formats (e.g. TAR). Decomposition of documents to their lowest level elementary (native) form is important in order to appropriately filter based on file typing and virus scan policies. The trusted relabeler software uses a third-party product by CyberSoft, Inc.™ called UAD to perform the decomposition. Once it is determined at step 54 that a file has been decomposed into its native components, the file typing checks can then be performed. As shown in FIG. 11, a series of steps starting at step 56 are performed on each file to determine if the file typing policy will allow or deny the reclassification of a file. As illustrated, this starts with a determination of the document file type for the bundle. This is performed at steps 56, 58, and 60 by a signature-based utility, such as UAD available from CyberSoft, Inc.™ Next, if necessary, a second signature-based, utility, such as a trusted computing file that utilizes a MAGIC database, is used to determine the type of content contained within the file. As known to those skilled in the art, the MAGIC database contains a mapping of data identifiers that can be used to determine the content of a file. The file extension and file types are then checked at steps 62 and 64 against the policies set forth in the trusted relabeler software configuration. If both the file extension and file type are allowed in the policy, the file is accepted. If any of the decomposed files from a bundle fail the file type function, the bundle as a whole fails and the role is shown an error message indicating the failure at step 66. Otherwise, the bundle is accepted and processing continues.

Content Filtering

Content filtering is a method by which the trusted relabeler software may prevent macro viruses (e.g. VBA and Word Basic) from appearing in OLE (Object Linking and Embedding) documents (e.g. Microsoft Word, Excel, and PowerPoint). The trusted relabeler software uses a tool called MVFILTER by CyberSoft, Inc.™ to perform the content filtering function at steps 68, 70 and 72. When enabled, content filtering is performed on OLE documents. By using both file type examination and file extension examination in concert, the trusted relabeler software accurately and reliably identifies data during the relabeling process.

Virus Scan

Virus scanning is another added level of security for the trusted relabeler software of the invention. Files that are found to contain a virus are restricted from being submitted for reclassification. Virus scanning is implemented in conjunction with file typing (FIG. 11) to only allow the acceptance of files that meet certain criteria. The trusted relabeler software uses a third party application called VFIND from CyberSoft Inc.™ to perform the virus scanning function. The trusted relabeler software may also provide a McAfee® virus scanning capability, which can be used in conjunction with VFIND or as an alternative to VFIND.

The decomposition of a bundle into its elementary (native) form was discussed above with respect to FIG. 11. The decomposition is very important in the case of virus scanning, because a virus is sometimes undetectable in compressed files such as the ZIP format. The trusted relabeler software uses its configurable policies to determine which file types require virus scanning.

FIG. 12 shows the overall process for the Virus Scan function of the trusted relabeler software of the invention. The function starts by iterating through each of the native files determined by the UAD tool at step 74. Depending on policy determined at step 76, the selected file is then virus scanned at step 78 using, for example, the VFIND tool from CyberSoft, Inc.™ Upon completion of VFIND execution on all necessary native files, the results of the virus scan function are returned to the trusted relabeler software. If any of the native files is found to contain a virus, the entire bundle virus scan fails and a description of the specific virus discovered is returned to the trusted relabeler software for display to the user. Upon successful completion of the virus scan stage, a Dirty Word Search (DWS) is performed. Processing ends at step 80 once all the data has been scanned.

Dirty Word Search (DWS)

The Dirty Word Search (DWS) is an automated document screening technique that ensures that documents containing classified information are not improperly relabeled during upgrade and downgrading processes and submitted to another computer network. Generally, the DWS software scans each document for "trigger" words. These trigger words are a list of security-sensitive terms or words that may indicate that a document contains classified information and has not been properly reviewed and, hence, that it should not be sent to another network.

There are two types of words in this automated DWS review process, dirty words and clean words. Dirty refers to words that should not be included in files at a specific classification level. Clean refers to words that are part of a dirty word but are allowed at a specific classification. One example of a dirty word might be "SECRET", while an example of a clean word might be "SECRETARY."

Common dirty words that apply to all labels of the system are maintained at the highest classification label, while dirty words that apply to a specific classification level are maintained at that specific label. Likewise, common clean words that apply to all labels of the system are maintained at the highest classification level, while clean words that apply to a specific classification level are maintained at that specific label. Generally, there are four different types of dictionary files defined in accordance with the invention: a master file for common dirty words (common), a supplemental file for label specific dirty words (label, or level, specific), a master file for common clean words (common), and a supplemental file for label specific clean words (label, or level, specific). Since the words contained within each of these dictionary files is considered classified information, typically only security managers are authorized to access and edit the contents for these dictionary files. The files are stored in locations as illustrated in FIG. 13.

IBM ICU4J String Search Library

When the DWS finds a document containing a dirty word, the Processor or Reviewer is presented with a list of the words found. The Processor or Releaser can either accept the words in the document (allowing the reclassification process to continue) or cancel the operation. The DWS function uses the IBM ICU4J string search library. The ICU4J library provides robust and full-featured Unicode services and is primarily designed to enable one single program to work with text in any language for any place in the world. One of the library's features allows the internal examination of any file in any language. The trusted relabeler software uses these features to scan a block of data for the presence of a particular dirty word. However, the ICU4J string search library does not take into account non-alphanumeric characters when pattern matching. The trusted relabeler software accounts for this by first storing the list of non-alphanumeric characters contained in a particular dirty word to be searched and checking them as appropriate.

Dirty Word Search Process

FIG. 14 illustrates the high-level process flow used on each file that is subjected to the trusted relabeler DWS feature in accordance with the invention. While conventional DWS algorithms are limited in their ability to detect dirty words and often list many false positives, such false positive reports are significantly reduced in accordance with the invention because the user may review the dirty words in context. From a visual perspective, showing separate embedded words versus non-embedded words allows the user a convenient mechanism to determine which matches are exact and which are not exact. In addition, and more importantly, the use of clean word definitions reduces the number of false positives since, for example, SECRET is a dirty word but SECRET is a clean word when it is embedded in the word SECRETARY. The word SECRETARY would not show up in the dirty word results displayed to the user.

The DWS function in accordance with the invention is illustrated in FIG. 14. As illustrated, the DWS function iterates over blocks of data starting at step 82 that compose the file content and analyze each block to determine if any dirty words are present. The primary DWS function loop begins by attempting to read a fixed size block of file content at step 82. If the end of file has been reached at step 84 and no file content is available for processing, the DWS routine exits at step 86 and returns its results to the trusted relabeler software. Otherwise, a loop is constructed to iterate over the list of dirty words that have been configured for the specified classification. Within this loop, a series of operations is performed to determine if a particular dirty word is present in the data block.

As illustrated in FIG. 14, if the last block of data read in is the end of file marker, the DWS function is exited at step 86. Otherwise the process continues to the next instruction (step 88). A file stream is opened to start reading dirty word definitions in one at a time for comparison operations against the block of data later on in the process (step 94). Otherwise the process continues at step 90. When the end of the dirty word list is reached at step 90, a next block of text data is requested (step 82). Otherwise the process continues (step 92). At step 92, the dirty word read in is scanned for non-alphanumeric characters. If any characters are found to be non-alphanumeric, they become significant for comparison operations later on in the process (step 98). Then at step 94, the initial scan of the text for dirty words is conducted using the IBM ICU4J text scanner. The ICU4J library provides robust and full-featured Unicode services and is primarily designed to enable one single program to work with text in any language for any place in the world. One of the library's features allows the internal examination of any file in any language. If the scanner determines at step 96 that a match is not found, another dirty word is requested (step 88). Otherwise, the process continues to step 98 where another re-scan is conducted taking all significant characters previously identified and compared against the block of data again, because the ICU4J string search library does not take into account non-alphanumeric characters when pattern matching. The trusted relabeler software accounts for this by first storing the list of non-alphanumeric characters contained in a particular dirty word to be searched. If the re-scan determines that a match was found as step 100, the process continues to step 102, otherwise another dirty word is requested for comparison (step 88). However, if it is determined that the significant characters within the dirty word also present a match against the block of data, the surrounding context is added at step 102 and the process continues to step 104; otherwise another dirty word is requested (step 88). At step 104, a text stream is opened to start reading the clean word definitions in one at a time for comparison against the block of data. If the clean word results in a match at step 106, then another dirty word is requested (step 88). Otherwise, the binary and ISO control characters are replaced with underscores at step 108 that mutate the block of data. The block of data is then passed on to a routine that will add it as an item to a list that is presented to the reviewer at step 110 as a positive match for a dirty word. Finally, if it is determined that the whole block of data has not been examined and still contains data that has not yet been compared, then the process passes it back to ICU4J scanner for more comparison against the remaining data (step 94). Otherwise, another dirty word is requested (step 88).

Finding Dirty Words

The dirty word scan will identify words within several areas of a document or file. The scan will identify words that are part of the textual content (body) of a document as shown in FIG. 15. It will also find words that are embedded as part of another word (e.g. SECRET is in SECRETARY). It will also find words in areas of a file that may be hidden or not otherwise be visible to the user (e.g. Metadata) as shown in FIG. 16. If a scan of a file reveals no results, the user is presented with the statement "No Dirty Words Found" (FIG. 17).

Completion of the Dirty Word Search

Upon completion of processing of all data blocks in a file and locating dirty words (if any), the resulting matches are returned to the trusted relabeler client software for presentation to the user (e.g. as shown in FIG. 15). In this window, the user is shown the list of dirty words found (left window pane) and can click on each to view the word and its surrounding text inside the content of the file (right window pane). Displaying the surrounding text allows the user to distinguish between exact matches that are visibly present in the textual content of a file. It can also display and identify a word that may be embedded as part of another word (e.g. SECRET is in the word SECRETARY). The user is then able to examine each occurrence of a word and acknowledge that the dirty word exists or they may approve the words that are not deemed to be dirty words. If the user approves all word matches (i.e. the user determined that the identified words are not dirty words), the bundle is allowed to continue its process for reclassification. If the user deems any of the words as legitimate dirty words, the reclassification is not allowed and the operation is cancelled.

Integrity Seal

The integrity seal is a security mechanism used to verify that the contents of a bundled file set have not been modified or tampered between the time the Processor submitted the files and the Reviewer performed final release of the Bundle.

Using the SHA-1 Cryptographic Hash

Similar to creating a unique fingerprint, when the Submitter selects electronic computer data for transmission to another computer network or domain, the trusted relabeler software uses the secure hash algorithm SHA-1 to generate a 160-bit condensed representation of a message digest suitable for use as a digital signature, thereby ensuring data integrity as it is passed to the next role for processing. Each cryptographic hash is specific to a file and is saved to a file for later retrieval and referenced when the next role (Reviewer) takes action on the bundle. FIG. 18 illustrates the procedural flow the integrity seal process.

As illustrated in FIG. 18, the integrity seal process begins by searching for two parameters at step 114. The first parameter would be either an absolute path or multilevel directory and filename, while the second parameter is an integer that determines which method (create or verify) should be invoked at step 118. On the other hand, if the parameters were determined at step 116 to be invalid, then the procedure would return a failure code back to the calling program at step 120.

Verifying the Integrity Seal

The verification procedure starting at step 122 is called from a switch invocation at step 118. The first action taken is locating and opening the SHA-1 cryptographic hash (key) file at step 124 that was previously created. If this key file does not exist or cannot be accessed, then a failure procedure at step 120 is followed with a failure result code back to the calling program. Otherwise the procedure continues to process the file a line at a time from the key file at step 126. The verification software reads each line (1024 bytes at a time) and parses its contents to include the path, filename and previous cryptographic hash at step 128 in a new digest at step 130. Additionally, a new cryptographic hash is created and compared against the old cryptographic hash at step 132. This will determine if the file or the cryptographic hash itself has been tampered or modified. At step 134, an audit record is generated and logged based on the results of the cryptographic hash comparison. This process continues until all lines of data and cryptographic hash are processed. If a failure is determined at any point in this process, then the procedure would return a failure code back to the calling program at step 120.

If no failures are detected, the application generates a new SHA-1 cryptographic hash starting at step 136 using the create seal procedure. This procedure is initiated from a switch passed at step 118 to the seal creation software. When this seal creation procedure is called it immediately tries to create at step 138 a new SHA-1 cryptographic hash file at the current process classification label. If a new SHA-1 cryptographic hash is successfully created, another procedure is invoked at step 140 that will perform recursion from the top-level directory on down looking for files to process. Each file found would have a cryptographic hash generated for it and the results would be stored into the newly created cryptographic hash file at step 142. Because the application's process classification label will always dominate the files being bundled, the bundle will be relabeled at step 144 based on the file within the bundle (example: If the process label is at TOP SECRET, and the highest file label processed was SECRET, then the bundle would be downgraded to match the overall label of the contents).

Completing the Integrity Seal Process

Every method invoked in the integrity seal process of FIG. 18 will return an exit status code of either success or failure at step 146. The exit status determines what type of logging or auditing action would be conducted based on administrator-configured options, as well as, a report back to the calling program that it was successful or failed in it actions.

Those skilled in the art will appreciate that other embodiments and features of the invention are possible within the scope of the invention. For example, while an exemplary embodiment has been described in the context of a DOD security classified system, those skilled in the art will appreciate that the invention may also be used in conventional files systems where different levels of security protections are provided for different data. Those skilled in the art will also appreciate that the methods and apparatus of the present invention, or certain aspects or portions thereof, may take the form of program code (i.e., instructions) embodied in any machine-readable storage medium wherein, when the program code is loaded into and executed by a machine, such as a computer, the machine becomes an apparatus for practicing the invention. Accordingly, any such modifications are intended to be included within the scope of this invention as defined by the following exemplary claims.

What is claimed is:

1. A system for relabeling files from one security classification level to another, where a security classification level is provided to a file based on security policies specifying a level of security required for access to contents of the file, comprising a processor and software implemented on said processor, said software including:

an interface generating process that enables a user to select one or a plurality of files to be relabeled from one security classification level to another to thereby change the level of security required to access the contents of the file(s) and, upon selection of a file(s) by the user, to submit the selected file(s) for relabeling at a particular or many different security classification levels; and a relabelling process that relabels the selected file(s) to one or more designated security classification levels to which the user is authorized, the relabelling process further classifying the user in one or more roles of a multi-person security review of the selected file(s) and segregating access by the user to respective portions of the relabeling process based on the user's role in a security review.

2. A system as in claim 1, further comprising file type software for processing the selected file(s) to determine file type of said selected file(s) by decomposing the selected file(s) to native file(s), analyzing the native file(s) to determine the type of content in the native file(s) using at least one signature based tool, examining a file extension contained in a name of the selected file(s), and if both the file type and file extension are allowed based on said security policies, allowing the selected file(s) to be processed; otherwise, rejecting processing of the selected file(s).

3. A system as in claim 1, further comprising virus scanning software that scans the selected file(s) to identify any viruses therein.

4. A system as in claim 1, further comprising dirty word searching software that identifies dirty (must be validated) words and clean (allowed) words in the selected file(s) for the designated security classification levels and displays results of dirty word searches to the user in context of the selected file(s) via a dirty word interface.

5. A system as in claim 4, wherein said dirty word searching software identifies non-alphanumeric characters and searches for matches in a list of clean and dirty non-alphanumeric characters.

6. A system as in claim 4, wherein said dirty word searching software identifies words within several areas of the selected file(s), including words that are part of the textual content (body) of the selected file(s), words that are embedded as part of another word, and words in areas of the selected file(s) that may be hidden or not otherwise be visible to the user and presents the results in context to said dirty word interface.

7. A system as in claim 1, further comprising integrity checking software that hashes the selected file(s) before passing the selected file(s) to a user with a different role.

8. A system as in claim 1, wherein the user is classified as one or more of a submitter, a processor, and a reviewer, where a submitter may select a file or files for relabeling based on the user's designated security classification level and select a processor that processes the selected file(s) to determine if the selected file(s) are suitable to relabel to a different designated security classification level, and a reviewer reviews results of a processing of the selected file(s) by the processor to determine if the selected file(s) may be relabeled to the different designated security classification level.

9. A computer-implemented method of relabeling files from one security classification level to another, where a security classification level is provided to a file based on security policies specifying a level of security required for access to contents of the file, the method comprising:
the computer providing an interface that enables a user to select one or a plurality of files to be relabeled from one security classification level to another to thereby change the level of security required to access the contents of the file(s) and, upon selection of a file(s) by the user, to submit the selected file(s) for relabeling at a particular or many different security classification levels;
the computer classifying the user in one or more roles of a multi-person security review of the selected file(s);
the computer segregating access by the user to respective portions of a relabeling process based on the user's role in a security review; and
the computer relabeling the selected file(s) to one or more designated security classification levels to which the user is authorized using a portion of the relabeling process to which the user is segregated.

10. A method as in claim 9, wherein said relabeling comprises the computer decomposing the selected file(s) to native file(s), the computer analyzing the native file(s) to determine the type of content in the native file(s) using at least one signature based tool, the computer examining the use of a file extension contained in a name of the selected file(s), and if both the file type and file extension are allowed based on said security policies, the computer allowing the selected file(s) to be processed; otherwise, the computer rejecting processing of the selected file(s).

11. A method as in claim 9, wherein said relabeling comprises the computer scanning the selected file(s) to identify any viruses therein.

12. A method as in claim 9, wherein said relabeling comprises the computer dirty word searching the selected file(s) to identify dirty (must be validated) words and clean (allowed) words in the selected file(s) for the designated security classification levels and the computer displaying results of dirty word searches to the user in context of the selected file(s).

13. A method as in claim 12, wherein said dirty word searching includes the computer identifying non-alphanumeric characters and the computer searching for matches in a list of clean and dirty non-alphanumeric characters.

14. A method as in claim 12, wherein said dirty word searching includes the computer identifying words within several areas of the selected file(s), including words that are part of the textual content (body) of the selected file(s), words that are embedded as part of another word, and words in areas of the selected file(s) that may be hidden or not otherwise be visible to the user, and the computer presenting the results in context to the user.

15. A method as in claim 9, wherein said relabeling comprises the computer hashing the selected file(s) before passing the selected file(s) to a user with a different role.

16. A method as in claim 9, wherein the classifying comprises the computer classifying the user as one or more of a submitter, a processor, and a reviewer, where a submitter may select a file or files for relabeling based on the user's designated security classification level and select a processor that processes the selected file(s) to determine if the selected file(s) are suitable to relabel to a different designated security classification level, and a reviewer reviews results of a processing of the selected file(s) by the processor to determine if the selected file(s) may be relabeled to the different designated security classification level.

17. A computer readable storage medium comprising:
interface generating software including instructions that when processed by a processor enables a user to select one or a plurality of files to be relabeled from one security classification level to another to thereby change a level of security required to access contents of the file(s) and, upon selection of a file(s) by the user, to submit the selected file(s) for relabeling at a particular or many different security classification levels, where a security classification level is provided to a file based on security policies specifying a level of security required for access to the contents of the file; and
a relabelling process including instructions that when processed by the processor relabels the selected file(s) from one security classification level to another security classification level to which the user is authorized, classifies the user in one or more roles of a multi-person security review of the selected file(s), and segregates access by the user to respective portions of the relabeling process based on the user's role in a security review.

18. A computer readable storage medium as in claim 17, further comprising:
file type software including instructions that when processed by the processor processes the selected file(s) to determine file type of said selected file(s) by decomposing the selected file(s) to native file(s), analyzing the native file(s) to determine the type of content in the native file(s) using at least one signature based tool, examining the use of a file extension contained in a name of the selected file(s), and if both the file type and file extension are allowed based on said security policies, allowing the selected file(s) to be processed; otherwise, rejecting processing of the selected file(s).

19. A computer readable storage medium as in claim 17, further comprising:
dirty word searching software including instructions that when processed by the processor identifies dirty (must be validated) words and clean (allowed) words in the selected file(s) for the designated security classification levels and displays results of dirty word searches to the user in context of the selected file(s).

20. A computer readable storage medium as in claim 19, wherein said dirty word searching software further includes instructions that when processed by the processor identifies non-alphanumeric characters and searches for matches in a list of clean and dirty non-alphanumeric characters.

21. A computer readable storage medium as in claim 19, wherein said dirty word searching software further includes instructions that when processed by the processor identifies words within several areas of the selected file(s), including words that are part of the textual content (body) of the selected file(s), words that are embedded as part of another word, and words in areas of a file that may be hidden or not otherwise be visible to the user and presents the results in context to the user.

22. A computer readable storage medium as in claim 17, further comprising integrity checking software including instructions that when processed by the processor hashes the selected file(s) before passing the selected file(s) to a user with a different role.

* * * * *